United States Patent
Amo et al.

[11] Patent Number: 5,951,806
[45] Date of Patent: *Sep. 14, 1999

[54] METHOD OF MANUFACTURING A STORAGE DISC

[75] Inventors: Mikuni Amo; Masami Inouchi, both of Tokushima-ken, Japan

[73] Assignee: Kitano Engineering Co., Ltd., Tokushima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/757,910

[22] Filed: Nov. 27, 1996

[30] Foreign Application Priority Data

Nov. 30, 1995 [JP] Japan .................... 7-338146

[51] Int. Cl.⁶ ............................................. G11B 7/26
[52] U.S. Cl. .................... 156/273.5; 156/275.5; 369/286
[58] Field of Search ................. 156/272.2, 273.3, 156/273.5, 275.5, 275.7, 242, 246, 74, 310, 314; 369/286; 428/694, 64.4; 118/319, 320

[56] References Cited

U.S. PATENT DOCUMENTS

| | | |
|---|---|---|
| 3,993,815 | 11/1976 | Douek et al. . |
| 4,877,475 | 10/1989 | Uchida et al. ............ 156/275.7 |
| 4,939,011 | 7/1990 | Takahashi et al. . |
| 4,965,117 | 10/1990 | Lautenschlaeger et al. . |
| 4,990,208 | 2/1991 | Kano .................. 156/275.5 |
| 4,995,799 | 2/1991 | Hayashi et al. . |
| 5,146,438 | 9/1992 | Harper . |
| 5,197,060 | 3/1993 | Yatuke ................... 428/694 |
| 5,244,775 | 9/1993 | Miura et al. ............. 369/286 |
| 5,273,598 | 12/1993 | Higashara et al. . |
| 5,284,538 | 2/1994 | Suzuki et al. ............ 156/154 |
| 5,318,653 | 6/1994 | Toide et al. ............. 156/295 |
| 5,401,610 | 3/1995 | Miwa et al. . |
| 5,409,971 | 4/1995 | Wolfergberger et al. ....... 523/201 |
| 5,558,735 | 9/1996 | Retter et al. ............ 156/275.7 |
| 5,591,264 | 1/1997 | Sugimote et al. ............. 118/320 |
| 5,600,359 | 2/1997 | Kikuchi . |
| 5,730,828 | 3/1998 | Somemiya et al. ........... 156/273.3 |

FOREIGN PATENT DOCUMENTS

| | | |
|---|---|---|
| 0 744 739 | 11/1996 | European Pat. Off. . |
| 61-139956 | 6/1986 | Japan . |
| 64-42037 | 2/1989 | Japan . |
| 4-53012 | 8/1992 | Japan . |

Primary Examiner—Michael W. Ball
Assistant Examiner—Barbara J. Musser
Attorney, Agent, or Firm—Flynn, Thiel, Boutell & Tanis, P.C.

[57] ABSTRACT

A method of manufacturing a storage disc by curing a substrate material thereof even if ultraviolet scarcely passes through the substrate material. The method comprises steps of discharging and coating an ultraviolet curing resin on a first disc-shaped resin substrate, developing the ultraviolet curing resin coated on the first disc-shaped resin substrate, irradiating the ultraviolet curing resin developed on the first disc-shaped resin substrate with ultraviolet to cure and coat the ultraviolet curing resin, discharging anaerobic ultraviolet curing resin on the first disc-shaped resin substrate which was coated with the ultraviolet curing resin, placing a second disc-shaped resin substrate which is coated with the ultraviolet curing resin on the first disc-shaped resin substrate, developing the anaerobic ultraviolet curing resin interposed between the first and second disc-shaped resin substrates, and curing the anaerobic ultraviolet curing resin interposed between the first and second disc-shaped resin substrates.

9 Claims, 7 Drawing Sheets

FIG. 1

| | |
|---|---|
| STEP 1 | FIRST DISCHARGING STEP |
| | ⇩ |
| STEP 2 | FIRST DEVELOPING STEP |
| | ⇩ |
| STEP 3 | FIRST CURING STEP |
| | ⇩ |
| STEP 4 | SECOND DISCHARGING STEP |
| | ⇩ |
| STEP 5 | OVERLAYING STEP |
| | ⇩ |
| STEP 6 | SECOND DEVELOPING STEP |
| | ⇩ |
| STEP 7 | SECOND CURING STEP |

| | |
|---|---|
| STEP 1 | FIRST DISCHARGING STEP |
| STEP 2 | FIRST DEVELOPING STEP |
| STEP 3 | FIRST CURING STEP |
| STEP 4 | SECOND DISCHARGING STEP |
| STEP 5 | OVERLAYING STEP |
| STEP 6 | SECOND DEVELOPING STEP |
| STEP 7 | TEMPORARY FIXING STEP |
| STEP 8 | SECOND CURING STEP |

METHOD OF MANUFACTURING A STORAGE DISC

BACKGROUND OF THE INVENTION

1. Field of the Invention

The present invention relates to a method of manufacturing a storage disc comprising an integrated substrate formed by bonding two substrates in at least one of which information is stored.

2. Prior Art

Computers, especially personal computers are remarkably spread recently, and a storage media to be used thereby, particularly capacity of a storage disc has been high dense and kinds of the storage media are increased. There is a magnetic disc, an optical disc (e.g., CD, CD-ROM), an optical magnetic disc (e.g., MO) as the storage disc. The demand of the optical disc as the storage disc is increased recently.

Exemplifying an optical disc called a DVD, a resin substrate, that is, a single plate constituting the DVD is required to have a thickness of 0.6 mm and an outer diameter of 120 mm and an inner diameter of its central hole of 15 mm. If such a disc-shaped resin substrate is formed of a single disc-shaped resin substrate, it is low in mechanical strength and is easily deformable. Accordingly, the disc-shaped resin substrates each having the same thickness (0.6 mm) are bonded to each other to form an integrated substrate. For example, FIG. 7 schematically generally shows a DVD of the optical disc formed of two disc-shaped resin substrates (a first disc-shaped resin substrate D1 and second disc-shaped resin substrate D2) which are bonded to each other.

Figure 7A:
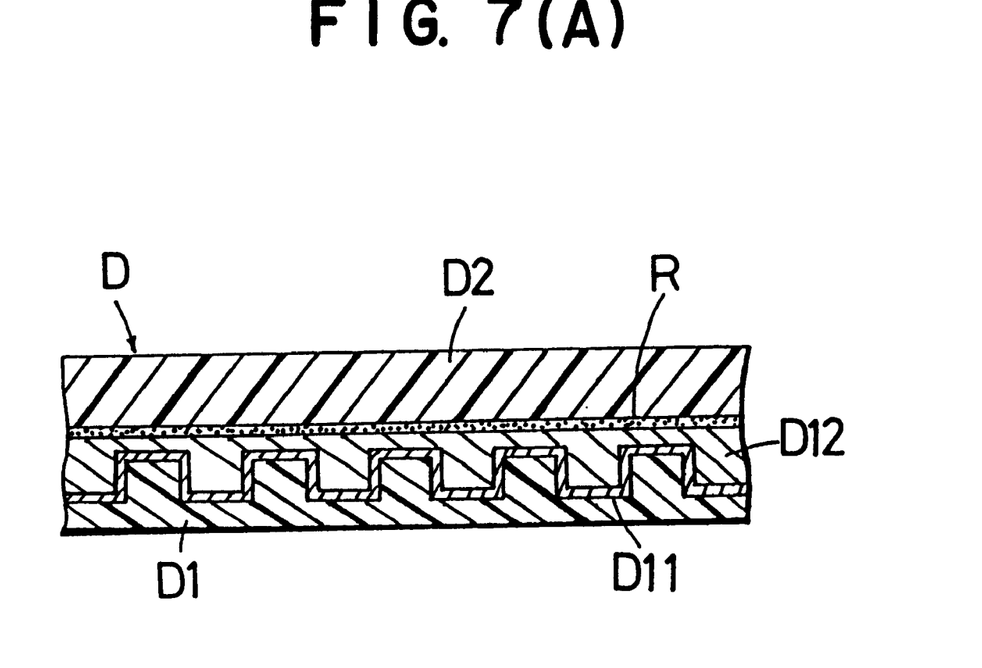
FIGS. 7(A) and (B) are a schematic cross sectional views showing an example of a general DVD as a storage disk.

In FIG. 7(A), the first disc-shaped resin substrate D1 is formed by a transparent polycarbonate resin by e.g., an injection molding machine. Irregular signal pits (signal holes) serving as information signals such as sound are transferred to one surface of the first disc-shaped resin substrate D1. A reflection coating D11 (e.g., aluminum film, etc.) is formed on the signal pits, and a protection coating D12 is formed on the reflection coating D11 to prevent the signal surface from being damaged.

The second disc-shaped resin substrate D2 formed of the transparent polycarbonate resin, etc. which is same as the first disc-shaped resin substrate D1 is bonded onto the first disc-shaped resin substrate D1 in which the signals or information is stored by way of an adhesive R.

The second disc-shaped resin substrate D2 may be directly bonded onto the first disc-shaped resin substrate D1 by way of the adhesive R without forming the protection coating D12 on the first disc-shaped resin substrate D1.

The optical disc D formed by bonding two first and second disc-shaped resin substrates D1 and D2 receives light reflected on the reflection coating D11 using laser beam by a light detector, not shown, to thereby reproduce the signal.

It is needless to say that the optical disc D called the DVD can employ the second disc-shaped resin substrate D2 in which signals or information is stored.

Since the high density storage disc including the DVD not used by the single substrate or plate but it is frequently used by the plural substrates or plates, the first disc-shaped resin substrate D1 and the second disc-shaped resin substrate D2 are needed to be bonded to each other.

A series of steps are performed to form an integrated storage disc (i.e., an optical disc) by bonding each single plate.

Step 1: an ultraviolet curing resin serving as an adhesive is coated onto an entire surface of the first disc-shaped resin substrate D1.

Step 2: the second disc-shaped resin substrate D2 is placed or overlaid on the first disc-shaped resin substrate D1.

Step 3: the ultraviolet curing resin interposed between the first and second disc-shaped resin substrates D1 and D2 is developed.

Step 4: the thus developed ultraviolet curing resin is cured.

Briefly explaining the steps set forth above, first in step 1, the ultraviolet curing resin is discharged on the first disc-shaped resin substrate D1 so as to be coated therewith in the step of coating with the ultraviolet curing resin, wherein the first disc-shaped resin substrate D1 has the signal pits coated with the reflection film and the protection film.

In step 2, a transparent second disc-shaped resin substrate D2 is placed on the first disc-shaped resin substrate D1 which is coated with the ultraviolet curing resin.

In step 3, ultraviolet curing resin interposed between the first and second disc-shaped resin substrates D1 and D2 is developed to be uniformly extended between the first and second disc-shaped resin substrates D1 and D2. This development of the ultraviolet curing resin is performed by rotating the integrated disc-shaped resin substrate formed by bonding the first and second disc-shaped resin substrates.

In step 4, the integrated first and second resin substrate is irradiated with ultraviolet from the upper portion thereof, thereby curing the ultraviolet curing resin.

The integrated storage disc is manufactured by bonding the first and second disc-shaped resin substrates. In the method of manufacturing the storage disc comprising the first and second bonded disc-shaped resin substrates, since the ultraviolet curing resin is used as an adhesive, it is an indispensable condition that the ultraviolet curing resin is irradiated with ultraviolet.

However, development of material of storage disc capable of storing higher density information has been recently needed in haste. Among such material, there appears such a material which is adapted for the high density storage disc but is difficult to allow ultraviolet to pass therethrough.

Accordingly, in the aforementioned step 4, there occurs a phenomenon that ultraviolet does not pass through the storage disc to sufficiently cure the ultraviolet curing resin even if the ultraviolet curing resin is irradiated with ultraviolet for curing the ultraviolet curing resin.

The fact that ultraviolet does not pass through the storage disc means that the ultraviolet curing resin is not irradiated with ultraviolet. There is such a limit of light transparency in the curing method using the ultraviolet curing resin. Under the background set forth above, the present invention has been made.

SUMMARY OF THE INVENTION

The present invention solved the problems under the aforementioned background of the invention. That is, it is an object of the present invention to provide a method of manufacturing a storage disc using the ultraviolet curing resin which can be cured even if ultraviolet does not necessarily pass through the ultraviolet curing resin when the ultraviolet curing resin is cured.

Meanwhile the inventors of the present application have endeavored themselves to research, and found out that air is hardly contained between two disc-shaped resin substrates when air bubble is removed owing to the development of the ultraviolet curing resin. In view of this finding, if anaerobic ultraviolet curing resin, which can bond two substrates in non-air surroundings, is employed, the two substrates can be bonded by this anaerobic ultraviolet curing resin at a part where ultraviolet does not reach.

That is, the first aspect of the present invention is a method of manufacturing a storage disc comprising the following first to seventh steps.

step 1: a step of discharging and coating an ultraviolet curing resin on a first disc-shaped resin substrate, the ultraviolet curing resin containing curing accelerator of anaerobic ultraviolet curing resin;

step 2: a step of developing the ultraviolet curing resin coated on the first disc-shaped resin substrate.

step 3: a step of irradiating the ultraviolet curing resin developed on the first disc-shaped resin substrate with ultraviolet to cure and coat the ultraviolet curing resin.

step 4: a step of discharging anaerobic ultraviolet curing resin on the first disc-shaped resin substrate which was coated with the ultraviolet curing resin.

step 5: a step of placing a second disc-shaped resin substrate which is coated with the ultraviolet curing resin on the first disc-shaped resin substrate, the ultraviolet curing resin containing curing accelerator of anaerobic ultraviolet curing resin;

step 6: a step of developing the anaerobic ultraviolet curing resin interposed between the first and second disc-shaped resin substrates.

step 7: a step of curing the anaerobic ultraviolet curing resin interposed between the first and second disc-shaped resin substrates.

The second aspect of the present invention is a method of manufacturing a storage disc according to the first aspect of the invention, further including a step of applying pressing force onto the anaerobic ultraviolet curing resin to cure the anaerobic ultraviolet curing resin in the step 7 of the first aspect of the invention.

The third aspect of the present invention is a method of manufacturing a storage disc according to the first aspect of the invention, further including a step of applying pressing force and heat onto the anaerobic ultraviolet curing resin to cure the anaerobic ultraviolet curing resin in step 7 of the first aspect of the invention.

The fourth aspect of the present invention is a method of manufacturing the storage disc according to the first aspect of the invention, further including a step of irradiating the anaerobic ultraviolet curing resin substrate with ultraviolet to temporarily fix the anaerobic curing resin substrate during a period between the steps of 6 and 7 of the first aspect of the invention.

The fifth aspect of the present invention is a method of manufacturing the storage disc according to the first aspect of the invention, further including a step of irradiating the anaerobic ultraviolet curing resin substrate with ultraviolet to cure an end of the storage disc following step 7 of the first aspect of the invention.

The sixth aspect of the present invention is a method of manufacturing the storage disc according to the first aspect of the invention, further including a step of collecting the ultraviolet curing resin which was developed in the step 2 of the first aspect of the invention.

The seventh aspect of the present invention is a method of manufacturing the storage disc according to the first aspect of the invention, further including a step of collecting the ultraviolet curing resin which was developed in step 6 of the first aspect of the invention.

The eighth aspect of the present invention is a method of manufacturing the storage disc according to the first aspect of the invention, wherein the irradiation with ultraviolet in step 3 of the first aspect of the invention is carried out while the first disc-shaped resin substrate is moved.

The ninth aspect of the present invention is a method of manufacturing the storage disc according to the first aspect of the invention, wherein the development in step 2 of the first aspect of the invention is carried out while the first disc-shaped resin substrate is rotated.

The tenth aspect of the present invention is a method of manufacturing the storage disc according to the first aspect of the invention, wherein the development in step 6 of the first aspect of the invention is carried out while the first and second disc-shaped resin substrates are rotated.

BRIEF DESCRIPTION OF THE DRAWINGS

FIGS. 4(A) and (B) are views respectively showing curing positions of the ultraviolet curing resins when it is temporarily fixed, wherein FIG. 4(A) is a case having no-ring groove, and FIG. 4(B) is a case having a ring-groove;

PREFERRED EMBODIMENT OF THE INVENTION

First Embodiment (FIGS. 1 through 4)

Figure 1:
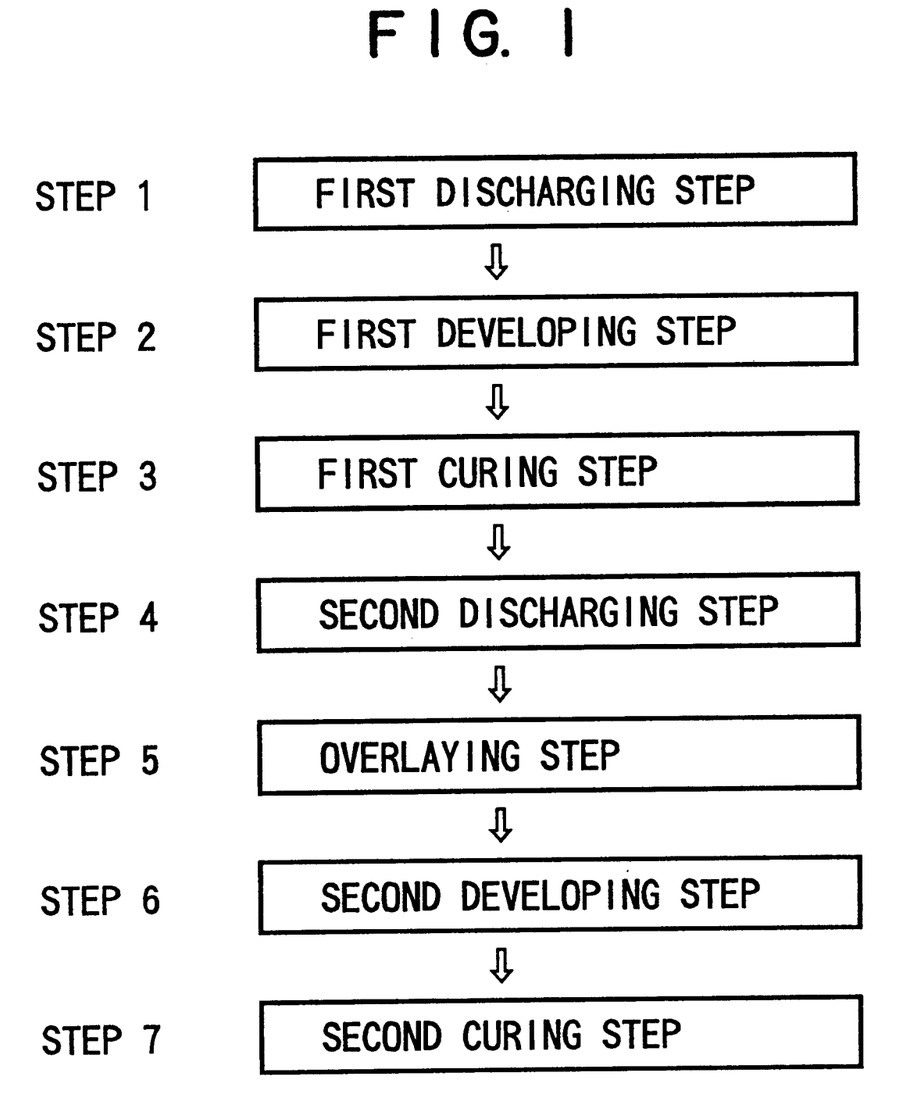
FIG. 1 is a block diagram showing processes or steps of manufacturing a storage disc according to a first aspect of the invention.
Figure 2:
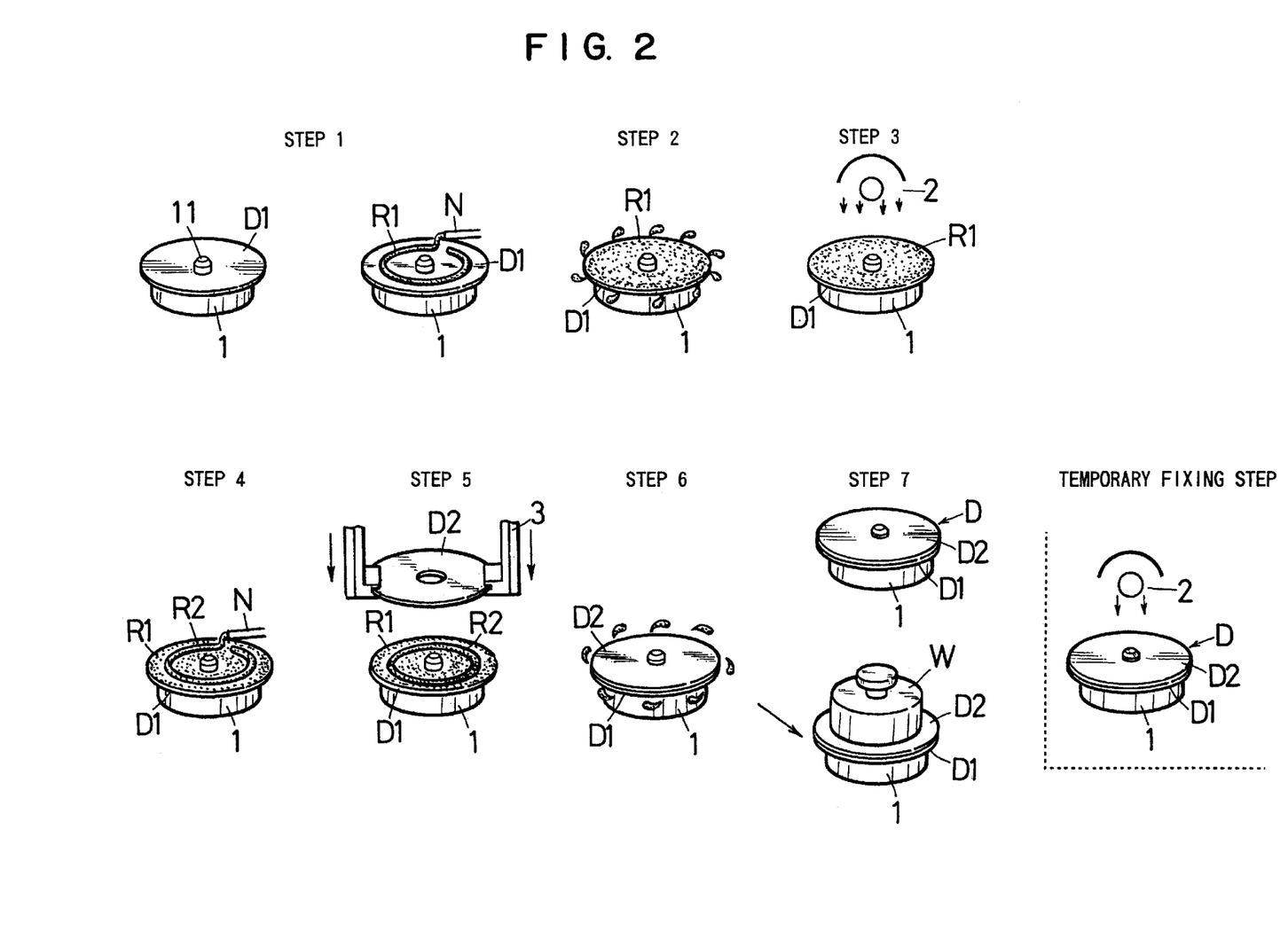
FIG. 2 is a schematic view showing each of the steps of manufacturing the storage disc.

FIG. 1 is a block diagram showing processes or steps of manufacturing a storage disc according to a first aspect of the invention, and FIG. 2 is a schematic view showing each of the steps of manufacturing the storage disc.

The method of manufacturing the storage disk comprises the following steps.

Step 1 (First Discharging Step)

In step 1, an ultraviolet curing resin R1 is discharged onto a first disc-shaped resin substrate D1 so as to coat the first disc-shaped resin substrate D1.

The ultraviolet curing resin R1 serving as an adhesive is discharged onto a surface of the first disc-shaped resin substrate D1 which was subjected to a sputtering in a state where the first disc-shaped resin substrate D1 is placed on a rotary table 1 (the rotary table 1 means a rotatable table).

In the coating step, the rotary table 1 is rotated at a relatively low speed (normally the number of rotation is about several tens rpm), and the ultraviolet curing resin R1 is discharged through a nozzle N from the upper portion of the rotary table 1. The ultraviolet curing resin R1 which was discharged onto the first disc-shaped resin substrate D1 is coated on the first disc-shaped resin substrate D1 in a spiral shape, a radial shape, a C-shape, and a doughnut shape.

The ultraviolet curing resin R1 has appropriate fluidity (e.g. those resins having a viscosity of several tens to several hundreds of centipoises are employed), so that immediately after coating on the first disc-shaped resin substrate D1 by discharge from nozzle N, it tends to, more or less, sag or run, thereby permitting the width of the coating to be widened. The ultraviolet curing resin R1 employed here is normally called an ultraviolet UV curing adhesive.

In order to ensure rapid curing against the anaerobic ultraviolet curing resin R2 which is used for bonding a first disc-shaped resin substrate D1 and the second disc-shaped resin substrate D2 in a subsequent step, the discharged ultraviolet curing resin used should be one which comprises an anaerobic ultraviolet curing resin of the type used above and a cure accelerator.

Examples of the ultraviolet curing resin R1 include combinations of (meth)acrylates and photocure initiators added thereto, combinations of epoxy compounds and photocure initiators, combinations of allyl compounds and photocure initiators, combinations of materials mainly composed of polyenes and polythiols, and photocure initiators, and mixtures thereof.

Examples of the (meth)acrylate used as the ultraviolet curing resin R1 include alkyl or substituted alkyl monofunctional (meth)acrylates such as methyl (meth)acrylates, ethyl (meth)acrylates, stearyl (meth)acrylates, benzyl (meth)acrylate, isobornyl (meth)acrylate, dicyclopentenyl (meth)acrylate, dicyclopentenyloxyethyl (meth)acrylate and the like.

The major components for the epoxy compounds include alicyclic compounds, to which aliphatic epoxy compounds or aromatic epoxy compounds may be added for controlling physical properties thereof.

The allyl compounds are those compounds having such a structure wherein the (meth)acrylate moiety of (meth)acrylates is replaced by an allyl group.

The photocure initiators include, for example, compounds capable of generating active radicals on ultraviolet irradiation, such as benzyl, benzyl dimethylketal, benzoin isopropyl ether, benzophenone, thioxanthone and the like, and compounds capable of generating Lewis acids on ultraviolet irradiation, such as triallyl sulfonium salts, pyridinium salts, iodonium salts, iron allene complexes and the like.

The cure accelerators for anaerobic ultraviolet curing agents include organometallic compounds such as copper naphthenate, copper octoate, copper 2-ethylhexanoate, copper acetylacetone, cobalt naphthenate, cobalt octoate, cobalt 2-ethylhexanoate, cobalt acetylacetone, nickel naphthenate, nickel octoate, nickel 2-ethylhexanoate, nickel acetylacetone, manganese naphthenate, manganese octoate, manganese 2-ethylhexanoate, manganese acetylacetone, vanadium naphthenate, vanadium 2-ethylhexanoate, vanadium acetylacetone and the like, and inorganic metal salts such as copper chloride, copper bromide, copper iodide, copper sulfate, copper carbonate, vanadium chloride, vanadium sulfate, vanadium carbonate, cobalt chloride, cobalt sulfate, cobalt carbonate and the like.

Step 2 (First Developing Step)

The step 2 is a first developing step for developing the ultraviolet curing resin R1 which is coated onto the first disc-shaped resin substrate D1. In the first disc-shaped resin substrate D1 onto which the ultraviolet curing resin R1 is coated, the ultraviolet curing resin R1 is uniformly developed onto the entire surface of the first disc-shaped resin substrate D1. This development is carried out by rotating the rotary table 1 at the several thousands rpm so as to uniformly develop the ultraviolet curing resin R1 with a thin thickness owing to centrifugal force.

The rotational speed is affected by a viscosity (e.g. normally several tens to several hundreds of centipoises (25° C.)) of the ultraviolet curing resin R1 to be used.

Since about 70 to 80% of the ultraviolet curing resin R1 is blown off when the ultraviolet curing resin R1 is developed, a dome cover is arranged to surround the first disc-shaped resin substrate D1 at the peripheral of the rotary table 1 so as to prevent the ultraviolet curing resin R1 from being dispersed. The ultraviolet curing resin R1 collected by this dome cover is reused.

Step 3 (First Curing Step)

Step 3 is a first curing step for irradiating the ultraviolet curing resin R1, which is developed onto the first disc-shaped resin substrate D1, with ultraviolet to cure the first disc-shaped resin substrate D1. In the step 3, the ultraviolet curing resin R1 which is developed onto the entire surface of the first disc-shaped resin substrate D1 is cured upon irradiation with ultraviolet from the upper portion thereof. The irradiation with ultraviolet lasts for about several seconds to several ten seconds although it depends on the strength of ultraviolet.

More concretely, the ultraviolet curing resin is irradiated with ultraviolet which is irradiated by an ultraviolet irradiation source in a state where the ultraviolet curing resin R1 is placed on the rotary table 1 in the developing step of the ultraviolet curing resin R1.

However, it is preferable that the ultraviolet curing resin R1 is once placed on another table (which is for example transferred by a conveyor, etc.) which is different from the rotary table 1 used in the developing step in view of productivity, and the ultraviolet curing resin R1 passes through the atmosphere where ultraviolet is irradiated in a state where the ultraviolet curing resin R is rotated or not rotated.

When the curing of ultraviolet curing resin R1 is completed, the ultraviolet curing resin R1 is coated onto the entire surface of the first disc-shaped resin substrate D1.

Step 4 (Second Discharging Step)

Step 4 is a second discharging step wherein an anaerobic ultraviolet curing resin R2 is further discharged onto the first disc-shaped resin substrate D1 which was coated with ultraviolet curing resin R1.

The anaerobic ultraviolet curing resin R2 used here serves as an adhesive between the first and second disc-shaped resin substrates D1 and D2, wherein there is employed the anaerobic ultraviolet curing adhesive, the anaerobic ultraviolet curing adhesive reacts with the ultraviolet curing adhesive, which was coated onto the first disc-shaped resin substrate D1, so as to be cured.

Curing condition is satisfied when the anaerobic ultraviolet curing resin R2 contacts the ultraviolet curing resin of the first disc-shaped resin substrate D1.

The anaerobic ultraviolet curing resin R2 is composed of ultraviolet curing resin which is added to the anaerobic curing resin.

Because of the addition of the ultraviolet curing resin, the temporary fixing step and the curing step for curing the end portions are effectively carried out.

The ultraviolet curing resin to be added is an ordinary ultraviolet curing resin which does not contain the curing accelerator.

The anaerobic curing resins include radical-polymerizable unsaturated compounds, such as (meth)

acrylic monomers, (meth)acrylate monomers, and oligomers thereof, to which quinone stabilizers, organic peroxide cure initiators, and curing catalysts are added.

The radical-polymerizable unsaturated compounds include radial-polymerizable monomers mainly composed of such acrylates and/or methacrylates as indicated hereinbefore.

The quinone stabilizers include p-benzoquinone, α-naphthoquinone, hydroquinone, hydroquinone monomethyl ether and the like.

The organix peroxide cure initiators include cumene hydroperoxide, t-butyl hydroperoxide, p-menthane hydroperoxide, 2,5-dimethylhexane-2,5-dihydroperoxide, 1,1,3,3-tetramethylbutyl hydroperoxide, methyl ethyl ketone peroxide, dicumyl peroxide, benzoyl peroxide, t-butyl proxy-2-ethylhexanoate, t-butyl peroxybenzoate, cumyl peroxyoctoate, t-butyl peroxyallylcarbonate and the like.

The curing agents include saccharin, mercaptans, pyrazoles, pyrazolones, toluidines, amines and the like.

In Step 4, the anaerobic ultraviolet curing resin R2 (having a viscosity of several hundreds to 1,000 of centipoises) is coated onto the surface of the first disc-shaped resin substrate D1 which was placed on the rotary table 1 and coated.

In the coating of the anaerobic ultraviolet curing resin R2, the rotary table 1 is rotated with relatively low speed (at several tens rpm) in the same manner as step 1, and the anaerobic ultraviolet curing resin R2 serving as an adhesive is discharged onto the rotary table 1 through the nozzle N from the upper portion of the rotary table 1.

The anaerobic ultraviolet curing resin R2 which was discharged onto the second disc-shaped resin substrate D2 is coated in the swirling shape, a radial shape, a C-shape, and a doughnut shape.

Figure 3A:
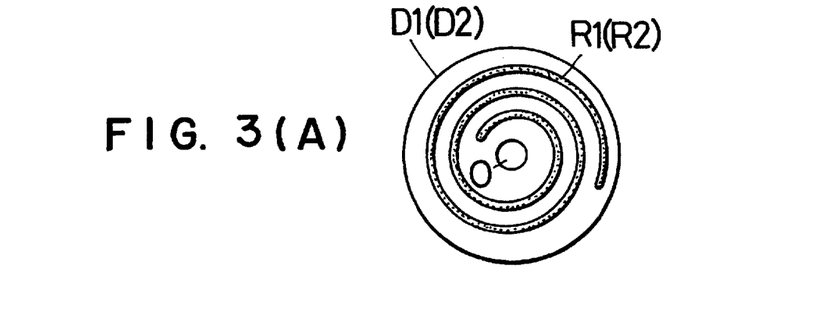
FIGS. 3(A) through (D) are views showing coating shapes of discharged ultraviolet curing resin.
Figure 3B:
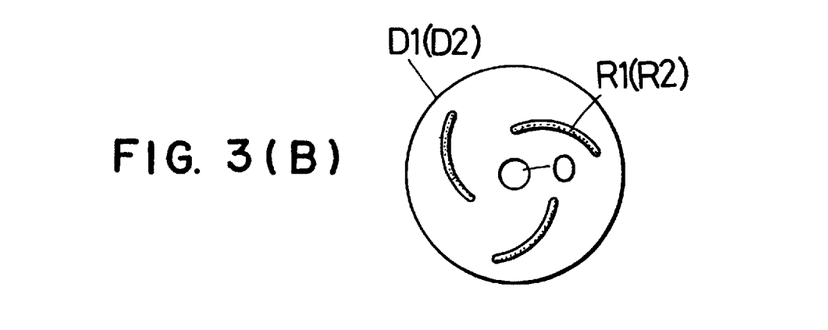
Figure 3C:
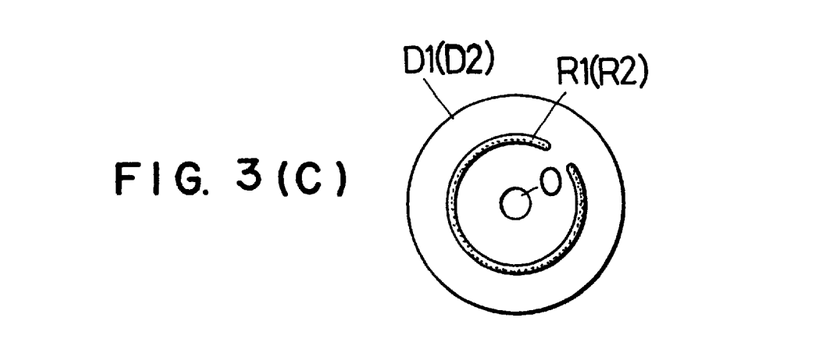
Figure 3D:
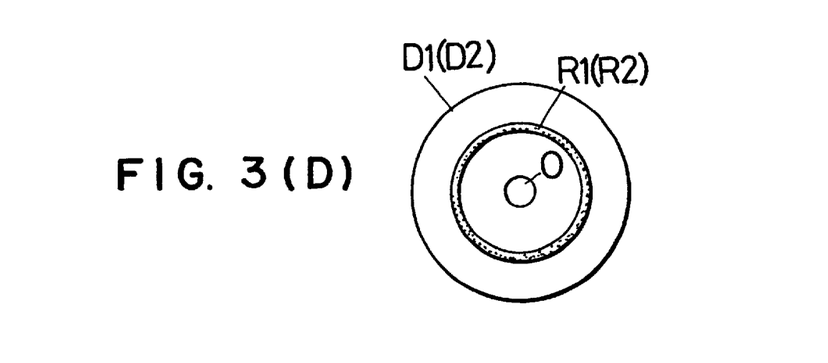

The shape of coating which excellently affects the following developing step is a doughnut one, which has been experimented by the inventors of this application.

Step 5 (Overlaying Step)

Step 5 is an overlaying step for placing another second disc-shaped resin substrate D2 (having a viscosity of, e.g. several hundreds to 1,000 of centipoises) which was coated with the ultraviolet curing resin on the first disc-shaped resin substrate D1. As the second disc-shaped resin substrate D2, there is employed a disc-shaped resin substrate, which was subjected to the coating with the ultraviolet curing resin onto the entire surface of the second disc-shaped resin substrate in the same manner as indicated in steps 1 through 3.

The second disc-shaped resin substrate D2 is overlaid onto the first disc-shaped resin substrate D1, which was coated with the anaerobic ultraviolet curing resin R2, so as to be in parallel as much as possible with the first disc-shaped resin substrate D1.

When the second disc-shaped resin substrate D2 is placed on the first disc-shaped resin substrate D1, there is employed a method of using a grip handle 3 for gripping the periphery of the second disc-shaped resin substrate D2 from both sides thereof or a suction chuck for sucking the second disc-shaped resin substrate D2 at the periphery of the central hole defined in the second disc-shaped resin substrate D2.

Step 6 (Second Developing Step)

Step 6 is a second developing step for developing the anaerobic ultraviolet curing resin R2 which is interposed between the first and second disc-shaped resin substrates D1 and D2. The integrated disc-shaped resin substrate composed of the overlaid first and second disc-shaped resin substrates D1 and D2 in Step 5 is rotated while it is placed on the rotary table 1, and the anaerobic ultraviolet curing resin R2 interposed between the first and second disc-shaped resin substrates D1 and D2 is uniformly developed.

The development of the anaerobic ultraviolet curing resin R2 is carried out in the thin thickness by rotating the rotary table 1 at the several thousands rpm owing to the centrifugal force thereof.

There is a case that the rotating speed is affected by the viscosity of the ultraviolet curing resin R1 to be used. Since 70 to 80% of the anaerobic ultraviolet curing resin R2 is blown off when the anaerobic ultraviolet curing resin R2 is developed, air (e.g., air bubble, air stagnation, etc.) closed between the first and second disc-shaped resin substrates D1 and D2 is discharged at the same time. A dome cover is arranged to surround the first disc-shaped resin substrate D1 at the periphery of the rotary table 1 so as to prevent the anaerobic ultraviolet curing resin R2 from being dispersed. The anaerobic ultraviolet curing resin R2 collected by this dome cover is reused.

There is employed a method of sucking the anaerobic ultraviolet curing resin R2 from the central hole of a boss 11 while the rotary table 1 is rotated, namely, of sucking the anaerobic ultraviolet curing resin R2 is sucked toward the central hole of the rotary table 1 for enhancing the development of the anaerobic ultraviolet curing resin R2.

Step 7 (Second Curing Step)

Step 7 is a second curing step for curing the anaerobic ultraviolet curing resin R2 interposed between the first and disc-shaped resin substrates D1 and D2. Since air is scarcely present between the first and second disc-shaped resin substrates D1 and D2 in a state where the anaerobic ultraviolet curing resin R2 is developed in Step 6, the anaerobic ultraviolet curing resin R2 is automatically cured when a given time elapses thereafter.

Although the anaerobic ultraviolet curing resin R2 is cured when the time elapses, it is preferable that pressure is applied to the first and second disc-shaped resin substrates D1 and D2 from the upper portion thereof when the anaerobic ultraviolet curing resin R2 is cured. As mentioned above, it is possible to prevent the first and second disc-shaped resin substrates D1 and D2 from being warped at the time of development of the anaerobic ultraviolet curing resin R2 when the anaerobic ultraviolet curing resin R2 remains under a given pressure for a given time while the anaerobic ultraviolet curing resin R2 is cured. The application of the pressure and heat are applied to the anaerobic ultraviolet curing resin speeds up the development of the anaerobic ultraviolet curing resin R2.

Since a tact time (time involved in working by an operator when, for example, a belt conveyor stops during the travel of the conveyor) is relatively long in Step 7, such a heating is required because of balancing of the entire tact times in view of productivity. As a concrete heating method, there is employed a heating means for heating the surface of the rotary table 1 on which the first and second disc-shaped resin substrates D1 and D2 are placed.

Meanwhile, the development of the anaerobic ultraviolet curing resin R2 can be accurately carried out when a given pressure is applied to the first and second disc-shaped resin substrates D1 and D2 while they are placed on the rotary table 1. However, since it is effective in view of productivity that the pressure is applied to the first and second disc-shaped resin substrates D1 and D2 while they are moved in a state where the integrated first and second disc-shaped resin substrates D1 and D2 are placed on another rotary table which is different from rotary table 1 at the time of development of anaerobic ultraviolet curing resin R2, for example a conical body W in FIG. 2 is used as a pressure means.

The first and second disc-shaped resin substrates D1 and D2 are completely bonded to each other when they remain pressurized for a given time, thereby forming a strong integrated disc-shaped resin substrate.

In the Steps 1 through 7 set forth above, the integrated disc-shaped resin substrate, i.e. the storage disc is manufactured by integrating the first disc-shaped resin substrate D1 and the second resin substrate D2.

It is preferable to add the following step for ensuring the manufacture of the storage disk.

Temporary Fixing Step

Figure 5:
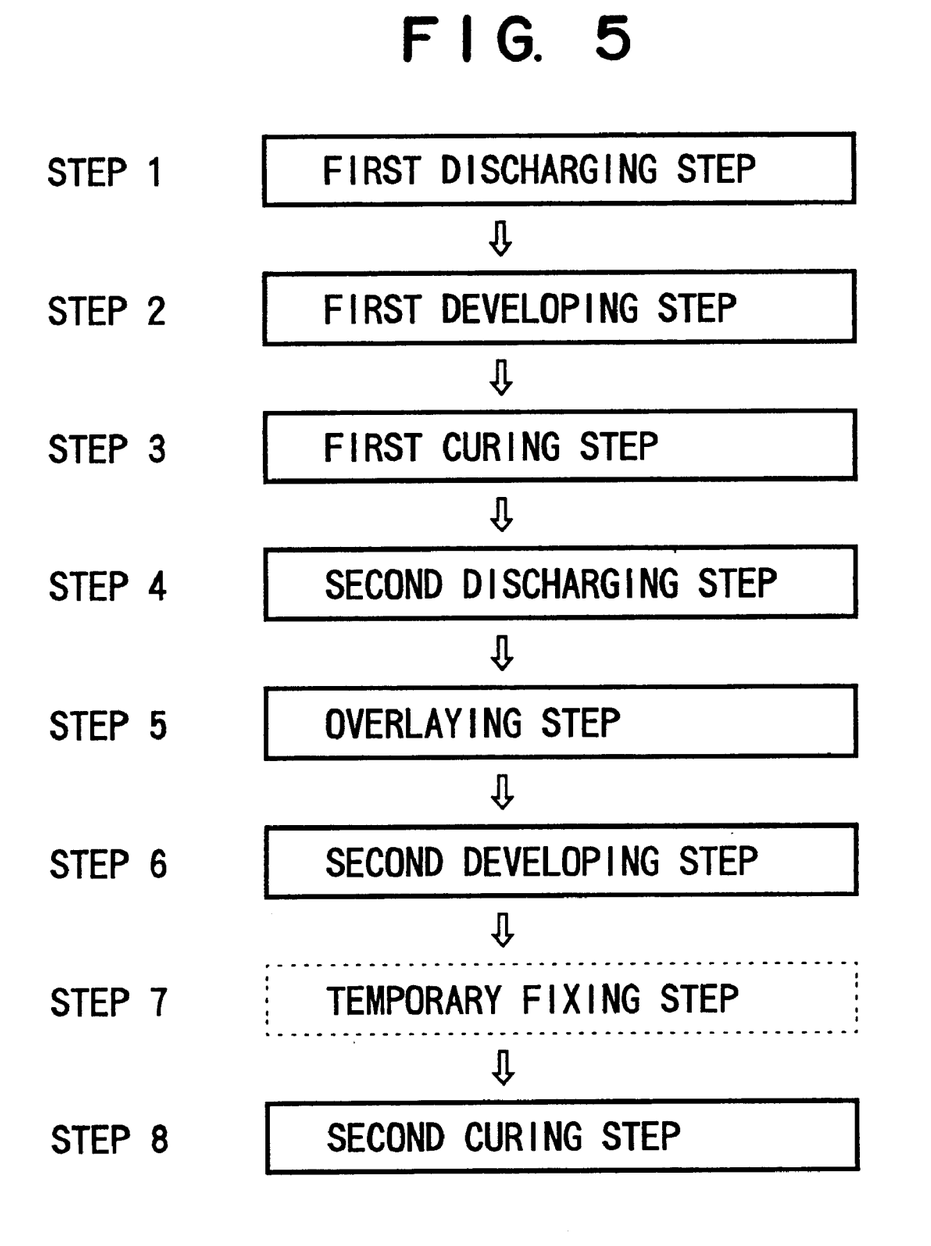
FIG. 5 is a block diagram showing steps of manufacturing a storage disc according to a second embodiment of the invention.

The temporary fixing step is the step for irradiating the anaerobic ultraviolet curing resin R2 with ultraviolet for temporarily fixing the two first and second disc-shaped resin substrates D1 and D2.

In Step 7, the integrated disc-shaped resin substrate has no air (hollow portion, air bubble, etc.) in the first and second disc-shaped resin substrates D1 and D2 when the development is completed. To maintain the state where air is not present between the first and second resin substrates D1 and D2, temporary fixing is required to prevent the two substrates from being got out of positions. That is, the central hole P2 and the peripheral end P1 of the integrated disc-shaped substrate is cured while the anaerobic ultraviolet curing resin R2 is irradiated with ultraviolet so that the integrated disc-shaped substrate, namely, the first and second disc-shaped resin substrates D1 and D2 are temporarily fixed to each other (see FIG. 4(A)). When the integrated disc-shaped resin substrate is once temporarily fixed, it remains in a state where air is discharged between the first and second disc-shaped resin substrates D1 and D2 while the first and second disc-shaped resin substrates D1 and D2 are not got out of positions. The addition of such a fixing step is included between the Steps 6 and 7 makes it possible to ensure the manufacture of the storage disk (see FIG. 5).

Figure 4A:
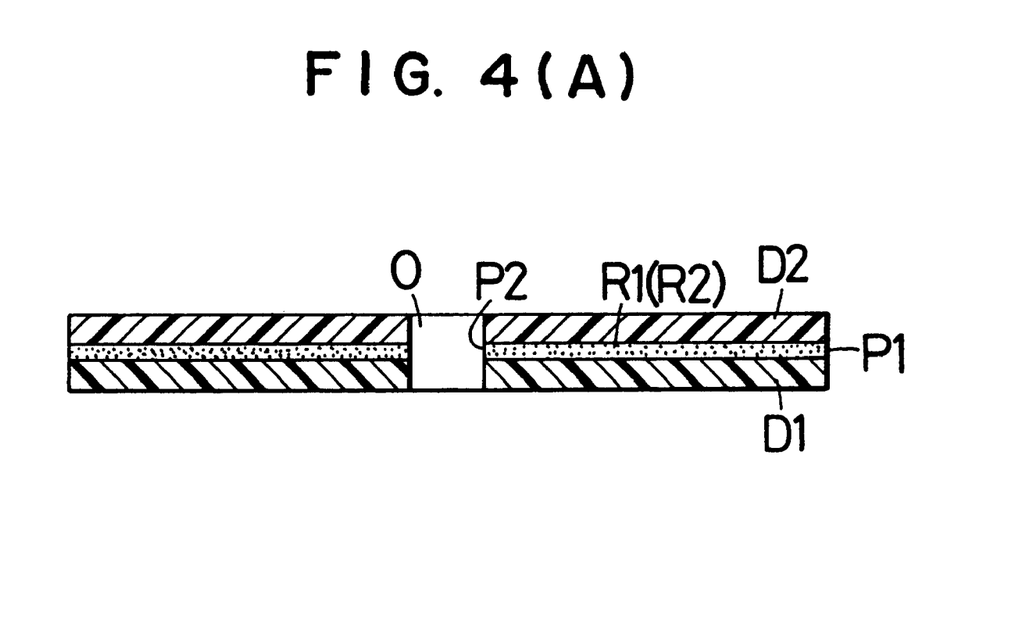

Meanwhile, since the anaerobic ultraviolet curing resin R2 which reached the outer peripheral end of the developed integrated disc-shaped resin substrate contacts air, the anaerobic ultraviolet curing resin R2 is liable to be delayed in curing. Since the anaerobic ultraviolet curing resin R2 which is developed almost to the end of the central hole contacts air, it is also liable to be delayed in curing.

Figure 4B:
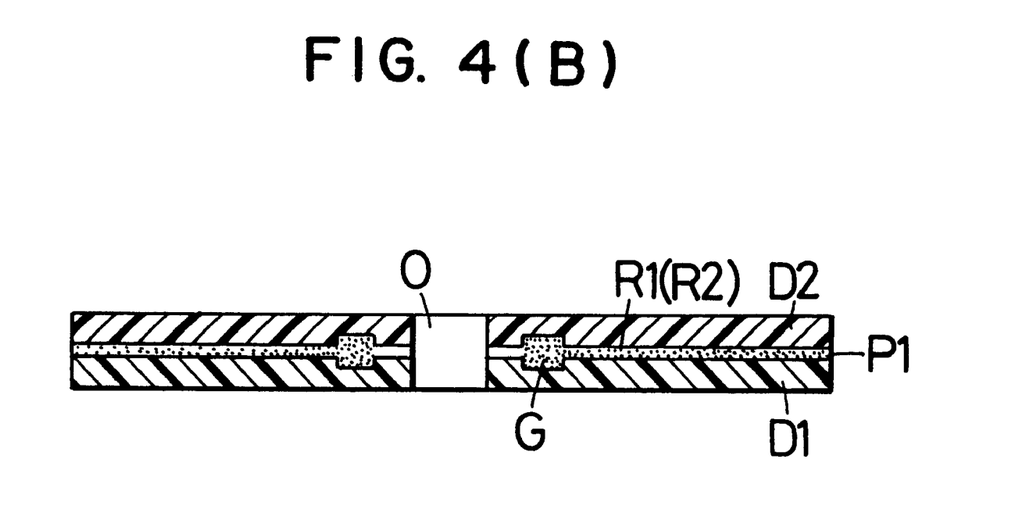

Some disc-shaped resin substrates have a standard wherein a ring-shaped groove G is normally provided in the disc-shaped resin substrate, so that the development of the anaerobic ultraviolet curing resin R2 is stopped at the position of the groove G.

In these cases, the anaerobic ultraviolet curing resin R2 is cured at the position of the ring-shaped groove G (see FIG. 4(B)). As mentioned above, there is an effect that the anaerobic ultraviolet curing resin R2 can be surely cured when it is irradiated by ultraviolet, even if the anaerobic ultraviolet curing resin R2 has a part contacting air which is difficult to be cured.

Figure 6:
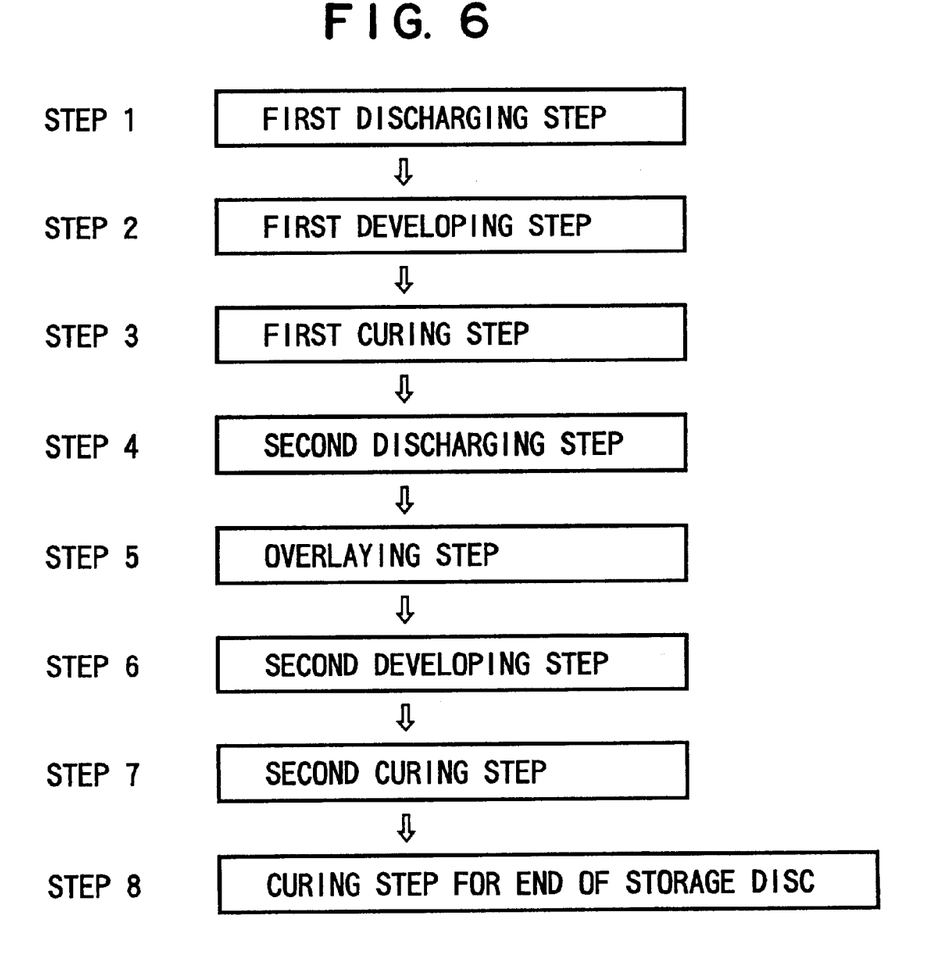
FIG. 6 is a block diagram showing steps of manufacturing a storage disc according to a third embodiment of the invention.

In such a sense, the step of irradiation of the anaerobic ultraviolet curing resin R2 with ultraviolet is added following the step 7 as to cure the anaerobic ultraviolet curing resin R2 at the end of the central hole or the outer peripheral end of the integrated disc-shaped resin substrate, thereby making it possible to manufacture the storage disk with assurance (see FIG. 6).

The method of manufacturing the storage disk of the present invention has an excellent advantage in that the storage disk having a substrate material through which ultraviolet hardly passes can be surely manufactured by using the ultraviolet curing resin R1 and the anaerobic ultraviolet curing resin R2 which can be excellently adhered with the ultraviolet curing resin R1 so as to bond the first and second disc-shaped resin substrates D1 and D2. This is the most significant advantage of the present invention.

Figure 7B:
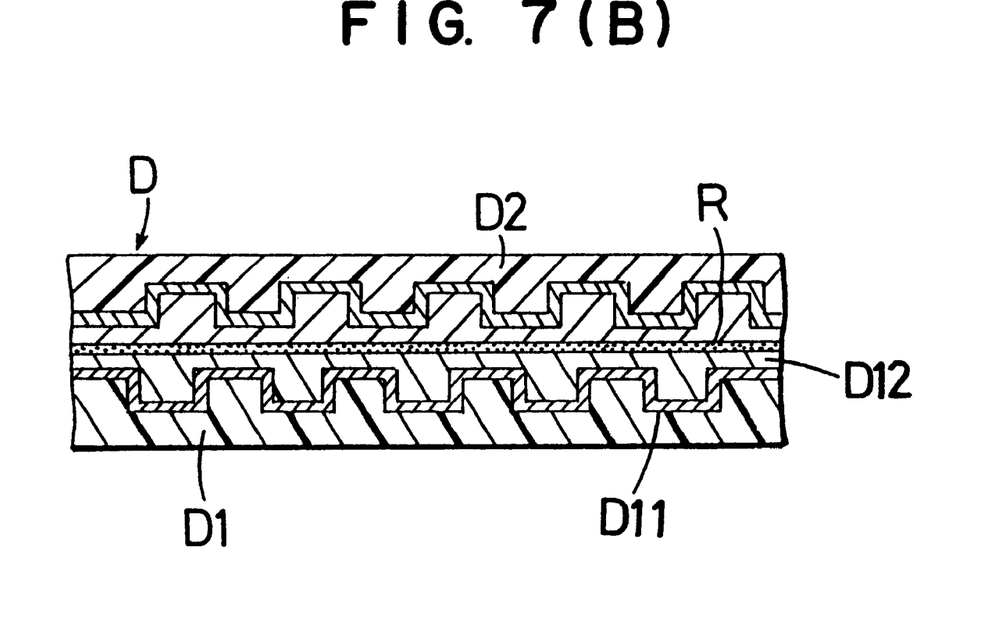

In the resultant manufactured storage disk shown in FIGS. 7(A) and 7(B), denoted by R comprises a double layer of the ultraviolet curing resin R1 and the anaerobic ultraviolet curing resin R2.

Although the present invention is explained with reference to various embodiments, it is not limited to such embodiments, and hence it is needless to say that the present invention can be modified variously. For example, the present invention can be applied to the optical disc wherein information can be stored in one of the ultraviolet curing resin R1 and R2 or in both of the ultraviolet curing resin R1 and R2 or information is not stored in both of the ultraviolet curing resin R1 and R2.

Various additives, such as viscosity increasing agent, coloring agent, amount increasing agents, may be added to the ultraviolet curing resin R1 or the anaerobic ultraviolet curing resin R2, if need be. It is needless to say that the same rotary table can be used at the same position during the steps 1 through 7 or different rotary tables can be used at the different positions during the steps 1 through 7. Further, a non-rotary table can be used during the steps 3, 5 and 7.

Even in the storage disc having a substrate material through which ultraviolet is difficult to pass, the two discs can be surely bonded to each other, resulting in sufficiently manufacturing a high density storage disc. It is also possible to manufacture only a high density storage disc having no air therein.

What is claimed is:

1. A method of manufacturing an optical storage disc comprising the steps of:

providing a first disc-shaped resin substrate and a second disc-shaped resin substrate, each of said first and second disc-shaped resin substrates having first and second sides;

discharging and coating an ultraviolet curing resin on the first side of the first disc-shaped resin substrate, said ultraviolet curing resin containing curing accelerator of anaerobic ultraviolet curing resin;

forming into a coating of uniform thickness the ultraviolet curing resin coated on the first disc-shaped resin substrate;

irradiating the ultraviolet curing resin on the first disc-shaped resin substrate with ultraviolet to cure and coat the ultraviolet curing resin;

discharging and coating an ultraviolet curing resin on the first side of the second disc-shaped resin substrate, the ultraviolet curing resin containing curing accelerator of anaerobic ultraviolet curing resin;

forming into a coating of uniform thickness the ultraviolet curing resin coated on the second disc-shaped resin substrate;

irradiating the ultraviolet curing resin on the second disc-shaped resin substrate with ultraviolet to cure and coat the ultraviolet curing resin;

discharging anaerobic ultraviolet curing resin on the first side of the first disc-shaped resin substrate coated with the ultraviolet curing resin;

then placing the first side of the second disc-shaped resin substrate coated with said ultraviolet curing resin on the first disc-shaped resin substrate;

forming into a coating of uniform thickness the anaerobic ultraviolet curing resin interposed between the first and second disc-shaped resin substrates;

then irradiating the anaerobic ultraviolet curing resin with ultraviolet to temporarily fix the first and second disc-shaped resin substrates to one another and to prevent air from entering therebetween at least at an outer peripheral edge thereof; and then anaerobically curing the anaerobic ultraviolet curing resin interposed between the first and second disc-shaped resin substrates.

2. The method of manufacturing the storage disc according to claim 1, further including a step of applying a pressing force onto the anaerobic ultraviolet curing resin to cure the anaerobic ultraviolet curing resin in the step of anaerobically curing the anaerobic ultraviolet curing resin.

3. The method of manufacturing the storage disc according to claim 1, further including a step of applying pressing force and heat onto the anaerobic ultraviolet curing resin to cure the anaerobic ultraviolet curing resin in the step of anaerobically curing the anaerobic ultraviolet curing resin.

4. The method of manufacturing the storage disc according to claim 1, further including the steps of:

collecting the excess ultraviolet curing resin during the step of forming into a coating of uniform thickness the ultraviolet curing resin; and collecting the excess anaerobic ultraviolet curing resin during the step of forming into a coating of uniform thickness the anaerobic ultraviolet curing resin.

5. The method of manufacturing the storage disc according to claim 1, wherein the irradiation with ultraviolet in the step of irradiating the ultraviolet curing resin with ultraviolet is carried out while the first disc-shaped resin substrate is moved.

6. The method of manufacturing the storage disc according to claim 1, wherein the step of forming into a coating of uniform thickness the ultraviolet curing resin is carried out while the first disc-shaped resin substrate is rotated.

7. The method of manufacturing the storage disc according to claim 1, wherein the step of forming into a coating of uniform thickness the anaerobic ultraviolet curing resin is carried out while the first and second disc-shaped resin substrates are rotated.

8. The method of manufacturing the storage disc according to claim 1, wherein said curing accelerator is selected from the group consisting of: copper naphthenate, copper octoate, copper 2-ethylhexanoate, copper acetylacetone, cobalt naphthenate, cobalt octoate, cobalt 2-ethylhexanoate, cobalt acetylacetone, nickel naphthenate, nickel octoate, nickel 2-ethylhexanoate, nickel acetylacetone, manganese naphthenate, manganese octoate, manganese 2-ethylhexanoate, manganese acetylacetone, vanadium naphthenate, vanadium 2-ethylhexanoate, vanadium acetylacetone, copper chloride, copper bromide, copper iodide, copper sulfate, copper carbonate, vanadium chloride, vanadium sulfate, vanadium carbonate, cobalt chloride, cobalt sulfate and cobalt carbonate.

9. The method of manufacturing the storage disc according to claim 1 wherein said step of irradiating the anaerobic ultraviolet curing resin further includes irradiating the anaerobic ultraviolet curing resin with ultraviolet to temporarily fix the first and second disc-shaped resin substrates to one another and prevent air from entering therebetween at an inner peripheral edge thereof.

* * * * *